United States Patent [19]

Thomas

[11] 4,043,046
[45] Aug. 23, 1977

[54] EDGE FINDER PROBE

[76] Inventor: Charles F. Thomas, 1016 Bahama Drive, Orlando, Fla. 32806

[21] Appl. No.: 670,147

[22] Filed: Mar. 25, 1976

[51] Int. Cl.² .......................... G01B 5/25; B27G 23/00
[52] U.S. Cl. .................................. 33/185 R; 33/23 K; 33/169 C; 33/172 D
[58] Field of Search .................. 33/23 H, 23 K, 27 K, 33/30 B, 169 R, 169 C, 174 P, 180 R, 185 R, 172 D; 279/1 A, 1 L, 1 S, 5

[56] References Cited

U.S. PATENT DOCUMENTS

| 2,533,198 | 12/1950 | Radtke | 33/172 D |
| 2,559,575 | 7/1951 | Fryklund et al. | 33/23 H |
| 2,607,989 | 8/1952 | Peterson et al. | 33/23 K |
| 2,860,418 | 11/1958 | Johnson | 33/172 D |
| 3,370,356 | 2/1968 | Jend | 33/172 D |
| 3,470,618 | 10/1969 | Richer | 33/169 C |

*Primary Examiner*—Richard E. Aegerter
*Assistant Examiner*—Richard R. Stearns
*Attorney, Agent, or Firm*—Duckworth, Hobby, Orman, Allen & Pettis

[57] ABSTRACT

An edge finding or indexing probe for locating an edge surface of an article positioned adjacent thereto. The edge finding device includes a housing having a first cylindrical cavity therein defined by a first cavity axis coaxially therethrough and a first cavity radius. A locating element includes a first cylinder defining a first circumferential surface for communicating within the first cylinder cavity of the housing. The locating element further includes a second cylinder defining a second circumferential surface for communicating with the edge surface of the article positioned adjacent thereto. The algebraic sum of the radius of the first cylinder plus the radius of the second cylinder is equal to the radius of the first cavity, whereby the localizing element moves within the first cavity to locate the edge surface along an extension of the first cavity axis.

9 Claims, 5 Drawing Figures

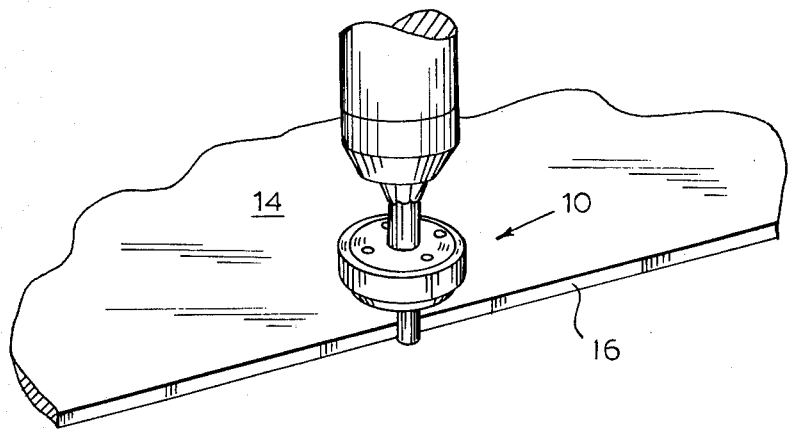
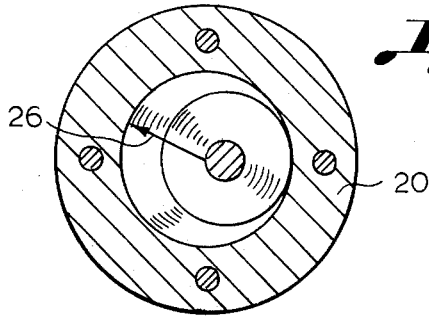
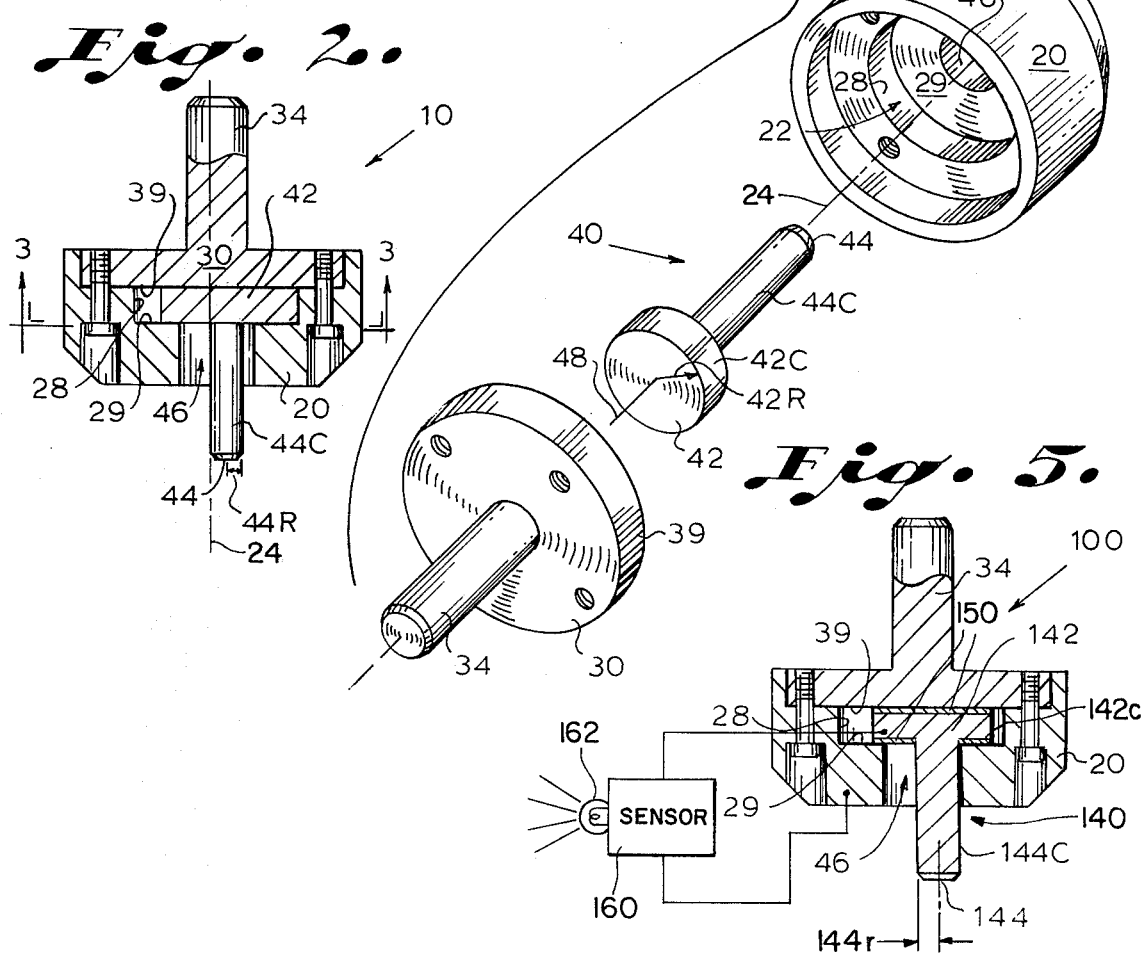

EDGE FINDER PROBE

BACKGROUND OF THE INVENTION

1. Field of the Invention

This invention relates to indexing devices and in particular to indexing devices for locating an edge surface of an article positioned adjacent thereto.

2. Description of the Prior Art

The edge indicating probe or precision edge finder is used by machinists working on materials with a jig bore machine, a milling machine, or other similar machines having adjustable or movable tables. The edge indexing device allows the workpiece or article to be quickly secured to the adjustable table, with the table then being moved into communicaton with the indexing device so that the heretofore time consuming measurement and adjusting steps may be eliminated or drastically shortened. For example, the exact location of holes within a workpiece may be confirmed by measuring the distance between each of the holes and one or more reference edges. In this manner any location in the area defined by the workpiece may be accurately predetermined by a space relationship with respect to one or more regularly shaped edges of the workpiece.

An early precision edge finder is disclosed by Rizor in U.S. Pat. No. 2,435,799. The Rizor precision edge finder utilizes an L-shaped element which communicates with the upper and side edge surfaces of the workpiece, and an indicator which fits within an elevated centering block. While this precision edge finder may be used to accurately locate the edge of a stationary workpiece, the L-shaped element must be repositioned each time a different section of the edge of the workpiece is measured. Also, the Rizor edge finder is subject to visual measurement errors induced by the requirement for aligning the probe with the cross hairs.

Others indexing devices are disclosed by Janci, In U.S. Pat. No. 3,813,989, Farnsworth, in U.S. Pat. No. 3,090,633, Cross, in U.S. Pat. No. 3,048,059, and Papps et al, in U.S. Pat. No. 3,026,621.

THE DRAWINGS

Other objects, features and advantages of this invention will be apparent from a study of the written description and the drawings in which:

FIG. 1 is a perspective view of the edge indexing device in communication with the edge surface of a workpiece;

FIG. 2 is a half-section view of the edge indexing device taken through a vertical central axis thereof;

FIG. 3 is a cross-section view taken along lines 3—3 of FIG. 2;

FIG. 4 is an exploded perspective view of the edge indexing device.

FIG. 5 is a half-section view of a second embodiment of the edge indexing device.

SUMMARY OF THE INVENTION

An indexing device for locating an edge surface of a workpiece positioned adjacent thereto. The edge indicating device includes a housing having a cylindrical bore therein, with the bore being defined by a bore axis centered therein and a known bore radius. A cylindrical shaft having a circumferential surface for communicating within and protruding from the bore of the housing is included. The cylindrical shaft is defined by a shaft axis centered therethrough and a shaft diameter equal to the radius of the bore. A protruding section of the circumferential surface of the cylindrical shaft communicates with the edge surface of the workpiece positioned adjacent thereto, whereby the circumferential surface of the cylindrical shaft locates the edge surface of the workpiece adjacent a line defined by an extension of the bore axis.

DETAILED DESCRIPTION OF THE PREFERRED EMBODIMENT

An edge indexing device, shown generally as 10 in FIG. 1, is intended to be coupled within a chuck 12 or other machine coupler for locating a point within a workpiece 14 having an edge surface 16. With reference to FIGS. 2, 3 and 4, the edge indexing device 10 includes a housing 20 having a first cylindrical cavity 22 located therein. The first cylindrical cavity 22 is defined by a first cavity axis 24 coaxially therethrough and a first cavity radius 26 communicating perpendicularly from the first cavity axis 24 to a first cavity circumferential surface 28. The lower planar surface 29 of the first cylindrical cavity 22 is generally parallel to the upper planar surface 39 defined by a generally disc-shaped housing plug 30. The housing plug 30 is coaxially coupled within an annular recess of the housing 20 by a plurality of screws 32 which communicate therebetween. The housing plug 30 further includes an engaging shaft 34 (or engaging means) for coupling the housing 20 to the chuck 12. A central axis of the engaging shaft 34 is coincident with the first cavity axis 24 and defines a reference point or reference line against which other locations are measured.

A locating element 40 includes a first cylinder 42 defining a first circumferential surface 42c for communicating within the first cylindrical cavity 22. The locating element 40 also includes a second cylinder 44 having a second circumferential surface 44c thereon. The second cylinder 44 communicates through an aperture 46 in the lower planar suface 29 defining the first cylindrical cavity 22. The protruding portion of the cylindrical surface 44c of the second cylinder 44 is adapted for communicating with the edge surface 16 of the article 14 located adjacent thereto. The first cylinder 42 and the second cylinder 44 are coaxially coupled about a common longitudinal axis 48 therethrough. The first cylinder 42 is defined by a first radius 42r measured between the longitudinal axis 48 and the first circumferential surface 42c. A second radius 44r of the second cylinder 44 is measured between the longitudinal axis 48 and the second circumferential surface 44c. With the first radius 42r being greater than the second radius 44r, the first cylinder 42 forms an annular head coaxial with the second cylinder 44. The thickness between the end parallel surfaces of the first cylinder 42 is created such that these surfaces are in close communication with the lower planar surface 29 and the upper planar surface 39 of the first cylindrical cavity 22. This close communication assures that the longitudinal axis 48 of the locating element 40 is maintained parallel to the first cavity axis 24, even when the edge surface 16 and the work piece 14 exert a separating force therebetween.

In a first preferred embodiment of the present invention, as shown in FIG. 2, the second radius 44r of the second cylinder 44 is less than a radius of the aperture 46 within the lower planar surface 29 of the first cylindrical cavity 22. This differential provides a clearance between the second circumferential surface 44c of the second cylinder 44 and the walls of the aperture 46.

However, the first radius 42r is sufficient to allow the first circumferential surface 42c to communicate with the first cavity circumferential surface 28 of the first cylindrical cavity 22. The measurements are chosen such that the sum of the first radius 42r of the first cylinder 42 plus the second radius 44r of the second cylinder 44 is equal to the first cavity radius 26 of the first cylindrical cavity 22. With this precise relationship, one vertical line on the second circumferential surface 44c will be coincident with an extension of the first cavity axis 24 of the first cylindrical cavity 22, regardless of the direction in which contact with the edge surface 16 of the workpiece 14 is made. Stating this mathematical arrangement another way, the second circumferential surface 44c of the edge indexing device 10 may be moved into contact with the edge surface 16 of the workpiece 14 from any direction with the assurance that the second cylinder 44 will force the first cylinder 42 into communication with the circumferential surface 28 of the first cylindrical cavity 22, thereby stopping the motion of the workpiece 14 such that the edge surface 16 thereof is precisely coincident with an extension of the first cavity axis 24.

The longitudinal axis 48 of the second cylinder 44 is maintained parallel to the first cavity axis 24 by the restraining action of the lower planar surface 29 and the upper planar surface 39 communicating against the end parallel surfaces of the first cylinder 42. Of course, the locating accuracy of the edge indicating device 10 is determined by the dimensional tolerances of the communicating parts, that is, the first cylindrical radius 42r, the second cylindrical radius 44r and the first cavity radius 26. The main advantage of the first preferred embodiment of the present invention is that the inner communicating surfaces are relatively shielded from the action of abrasives or other contaminates which may migrate through the aperture 46 and into the first cylindrical cavity 22 to foul the communicating surfaces therein.

In a second preferred embodiment 100 of the present invention, as shown in FIG. 5, the second cylindrical surface 144c is designed to communicate against the surface defined by the aperture 46 in the lower planar surface 29 of the housing 10. With this arrangement, a second radius 144r of the second cylinder 144 is chosen to be exactly one-half the radius of the aperture 46. The second preferred embodiment of the present invention performs in essentially the same manner as the first preferred embodiment with the exception that the communication between the second cylindrical surface 144c and the aperture 46 determines the location of the edge surface 16 of the workpiece 14 which is in communication with the protruding or distended portion of the second cylinder 144. A first cylinder 142 communicates within the first cylindrical cavity 22, with the planar end surfaces of the first cylinder 142 being in close communication with the lower planar surface 29 and the upper planar surface 39 of the housing 20 in order to maintain the longitudinal axis 48 of the locating element 40 parallel with the first cavity axis 24 of the first cylindrical cavity 22. In the second preferred embodiment it is not necessary to have the first circumferential surface 142c of the first cylinder 142 in communication with the first cavity circumferential surface 28 of the first cylindrical cavity 22. The main advantage of the second preferred embodiment of the present invention is that only the radius of the aperture 46 and the radius 144r of the second cylinder 144 must be machined to the proper tolerances. However, the second preferred embodiment of the present invention would not normally be used in an environment in which particulate matter would be free to contaminate or clog the communication between the second cylindrical surface 44c and the circumferential surface of the aperture 46.

While the edge indexing device may be constructed of any durable, non-deforming material, the preferred embodiment is constructed from hardened tool steel. While FIG. 1 represents the preferred utilization of the edge indexing device 10, it should be obvious to one skilled in the art that different uses of the edge indexing device 10 may be developed without departing from the letter and spirit of the invention.

The operation of the edge indexing device will be explained with reference to FIGS. 1 and 3. The engaging shaft 34 of the edge indexing device 10 is inserted into the chuck or holding device 12 and secured therein. The second cylinder 44 is then centered with the aperture 46. The edge indexing device 10 is then moved toward the workpiece 14 until the operator observes that the circumferential surface 44c of the second cylinder 44 is in communication with the edge surface 16. The workpiece may then be moved slowly toward the edge indexing device 10 until the operator feels or hears the communication between a circumferential surface of the locating element 40 and the housing 20. The edge surface 16 is then located precisely along an extension of the longitudinal axis of the engaging shaft 34 and the first cylindrical cavity 22.

The edge indexing device is especially well suited for use with the new digital coordinate checking machines, since a single edge indexing device is capable of locating an edge in either the X-plane, the Y-plane or any combination of the two without any adjustments or re-orientation. The engaging shaft 34 of the edge finding probe 10 is first inserted into the holding device 12 of the coordinate checking device. The second cylinder 44 is then moved to approximately the center of the aperture 46. The operator may then move the edge indexing device 10 toward the X-plane reference edge of the workpiece 14 until the operator hears, feels or visually confirms the communication between the circumferential surface of the locating element 40 and the housing 20. The X-plane edge surface is then located precisely along an extension of the longitudinal axis of the engaging shaft 34 and the first cylindrical cavity 22, thereby allowing the operator to initialize to zero the X-plane numerical coordinate readout. A similar procedure is followed for initializing the Y-plane coordinate readout with reference to a chosen Y-plane edge.

After both the X-plane and Y-plane coordinates have been initialized to zero, the X and Y coordinates of any linear surface on the workpiece may be located by moving the edge indexing device 10 into communication with the edge surface until the circumferential surface of the locating element 40 communicates with the housing 20. Since the accuracy of the edge locating device is independent of the direction of contact with the edge, surfaces having any combination of X and Y plane components may be easily and accurately located. This technique is especially well suited for measuring the dimensions of large diameter apertures within the workpiece. Furthermore, once the digital coordinates have been initialized to zero, the edge finding device may be removed from the holding device and a symetrically tapered probe may be substituted therefore, thus allowing the operator to accurately locate the precise X and Y coordinates of the center of circular apertures within the workpiece without the requirement for adjustments or offset computations.

Both the first and second preferred embodiments of the present invention may be modified to provide an electrical switch closure responsive to the proper positioning of the edge surface 16 by placing wafer sections of insulating material 150 on both of the planar end surfaces of the first cylinder 142. By coupling an impedance sensor 160, or equivalent circuit means, between the locating element 140 and the housing 20, the contact between the circumferential surface 142c of the first cylinder 142, or the circumferential surface 144c of the second cylinder 144, and the housing 20 may be indicated on a remotely located visual indicator 162 or as a signal to a computer controlled machine.

It should be apparent at this point that a new and useful edge indicating device has been described with reference to a first and second preferred embodiment which are merely examples of the invention as claimed. However, the present invention should not be limited in its application to the construction details and the parts illustrated in the accompanying drawings, since this invention may be practiced or constructed in a variety of other different embodiments. Also, it should be understood that the terminology and descriptions employed herein are used solely for the purpose of describing the preferred embodiments and should not be construed as limitations on the operability of the invention.

I claim:

1. An edge indexing device for locating an edge surface of an article positioned adjacent thereto, said edge indexing device comprising:
   a housing having a cylindrical bore therein, said bore being defined by a bore axis centered therein and a bore radius;
   a cylindrical shaft having a circumferential surface for communicating within and protruding from said bore of said housing, with said cylindrical shaft being defined by a shaft axis centered therein and a shaft diameter equal to said bore radius, with a protruding section of said circumferential surface of said cylindrical shaft communicating with said edge surface of said article positioned adjacent thereto; and
   parallel means for movably coupling said cylindrical shaft within said bore with said shaft axis parallel to said bore axis for permitting lateral movement of said cylindrical shaft within said bore, whereby said circumferential surface of said cylindrical shaft locates said edge surface about a line defined by an extension of said bore axis.

2. The edge indexing device as recited in claim 1 wherein said parallel means comprises an annular head attached to one end of said cylindrical shaft, said annular head having opposing parallel ends for being movably juxtaposed between opposing parallel sides of a generally cylindrical cavity within said housing.

3. An edge indexing device for locating an edge surface of an article positioned adjacent thereto, said edge indexing device comprising:
   a housing having a first cylindrical cavity therein defined by a first cavity axis coaxially therethrough and a first cavity radius;
   locating means having a first cylinder defining a first circumferential surface for circumferentially communicating within said first cylindrical cavity of said housing, said locating means having a second cylinder defining a second circumferential surface for circumferentially communicating with said edge surface of said article positioned adjacent thereto, said first circumferential surface having a first radius and said second circumferential surface having a second radius, with said first and second cylinders being coaxially coupled about a common longitudinal axis therethrough, and with the sum of said first radius and said second radius being equal to said first cavity radius; and
   parallel means for movably coupling said first cylinder within said first cylindrical cavity with said common longitudinal axis being parallel to said first cavity axis for permitting lateral movement of said locating means with respect to said first cavity axis, whereby said locating means moves to locate said edge surface of said article positioned adjacent thereto along an extension of said first cavity axis of said housing.

4. The edge indexing device as recited in claim 3 wherein said parallel means comprises first and second parallel surfaces for partially enclosing the ends of said cylindrical cavity of said housing, with said first and said second parallel surfaces being spaced for movably restraining therebetween parallel end surfaces of said first cylinder.

5. The edge indexing device as recited in claim 4 wherein said first parallel surface includes an aperture therein for allowing said second cylinder to movably communicate therethrough.

6. The edge indexing device as recited in claim 5 wherein said first radius of said first cylinder is greater than said second radius of said second cylinder.

7. The edge indexing device as recited in claim 3 including engaging means for coupling said housing to a reference coupler having a reference point thereon, with said engaging means for maintaining a known distance between said first cavity axis and said reference point.

8. The edge indexing device as recited in claim 7 wherein said engaging means comprises an engaging shaft having a longitudinal axis thereof coaxial with said first cavity axis of said housing.

9. The edge indexing device as recited in claim 3 further comprising electrical indicating means for indicating when said edge surface of said article is positioned along an extension of said first cavity axis.

* * * * *